United States Patent [19]
Arai

[11] Patent Number: 5,798,996
[45] Date of Patent: Aug. 25, 1998

[54] METHOD AND APPARATUS FOR RECORDING DIGITAL DATA BY CONTROLLING THE LOCATION OF THE EDGE OF RECORDING PITS THROUGH MODULATION OF A LASER

[75] Inventor: Masayuki Arai, Tokyo, Japan

[73] Assignee: Sony Corporation, Tokyo, Japan

[21] Appl. No.: 492,783

[22] Filed: Jun. 21, 1995

[30] Foreign Application Priority Data

Jun. 24, 1994 [JP] Japan ................................. 6-166264
Sep. 29, 1994 [JP] Japan ................................. 6-259530

[51] Int. Cl.$^6$ ................................................. G11B 5/09
[52] U.S. Cl. ........................................ 369/59; 369/116
[58] Field of Search ........................... 369/59, 13, 275.4, 369/116, 58, 124, 275.2; 350/51, 59

[56] References Cited

U.S. PATENT DOCUMENTS

| | | | |
|---|---|---|---|
| 5,450,381 | 9/1995 | Tsukamura | 369/13 |
| 5,517,481 | 5/1996 | Kobayashi | 369/59 |
| 5,533,003 | 7/1996 | Kobayashi | 369/275.4 |
| 5,566,158 | 10/1996 | Kobayashi et al. | 369/59 |
| 5,577,012 | 11/1996 | Kobayashi et al. | 369/59 |
| 5,615,193 | 3/1997 | Kobayashi et al. | 369/59 |

*Primary Examiner*—Tan Dinh
*Attorney, Agent, or Firm*—Limbach & Limbach L.L.P.

[57] ABSTRACT

A method for recording digital data for recording and reproducing data at a high transfer rate. A recording basic clock is generated which synchronizes with the reference clock previously recorded on an optical recording medium and has the same frequency as the basic clock of data to be recorded, the recording signal is generated in which the phase of recording basic clock is slightly shifted corresponding to the data to be recorded, and the data is recorded on the optical recording medium by modulating a laser beam by the recording signal. Therefore, it is possible to realize a method for recording digital data, a digital data recording apparatus and a digital data recording/reproducing apparatus capable of recording data with a simple constitution at a high speed when a data is optically recorded by shifting the edge position of information pit stepwise from the predetermined reference position in accordance with the recording information.

9 Claims, 17 Drawing Sheets

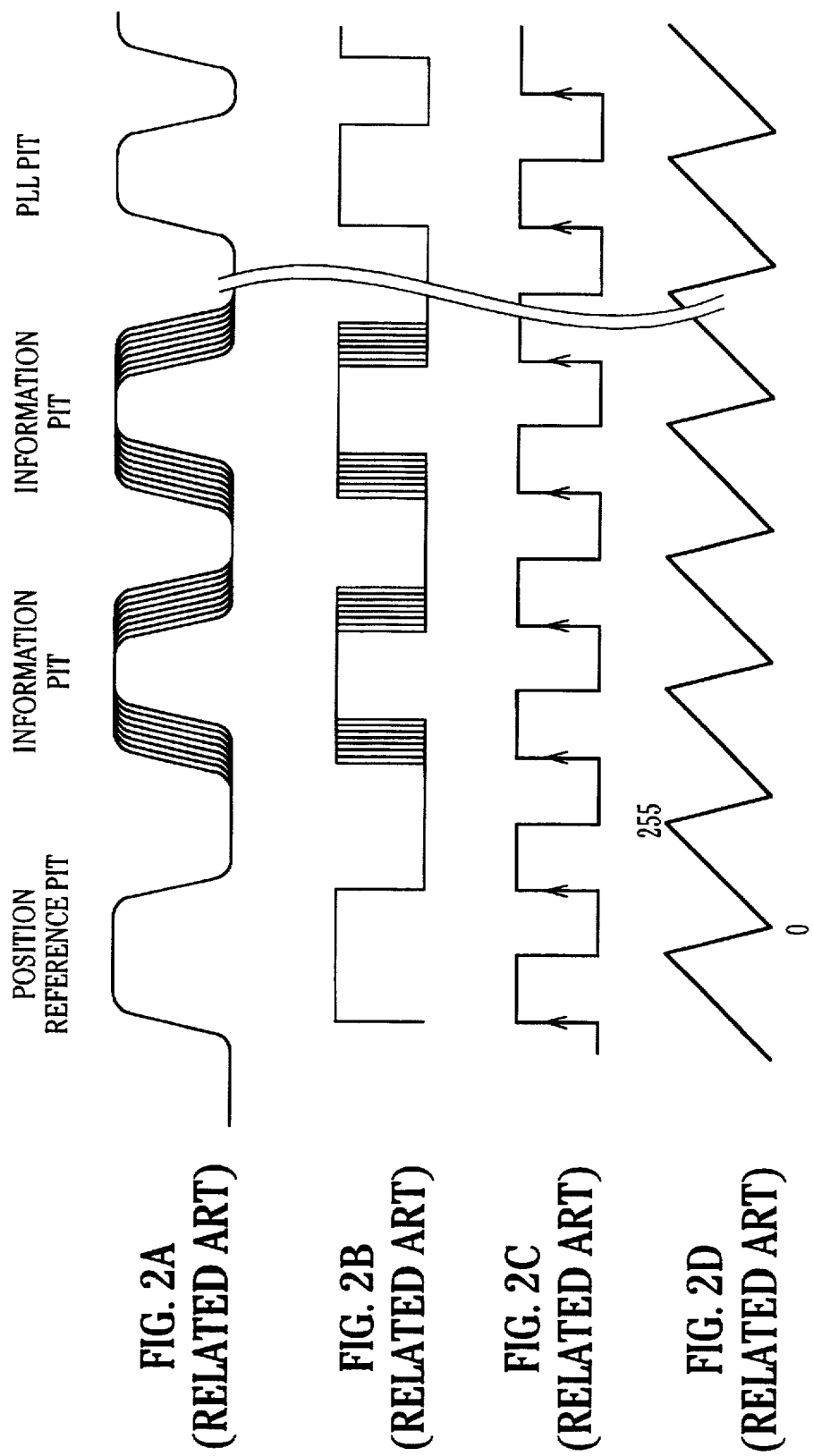

METHOD AND APPARATUS FOR RECORDING DIGITAL DATA BY CONTROLLING THE LOCATION OF THE EDGE OF RECORDING PITS THROUGH MODULATION OF A LASER

BACKGROUND OF THE INVENTION

1. Field of the Invention

The present invention relates to a digital data recording method and apparatus thereof, and a digital data recording/reproducing apparatus which can be applied, for example, to recording desired data in a magneto-optical disc at a high density.

2. Description of the Related Art

As a recording/reproducing method of a magneto-optical disc apparatus, a method is hitherto proposed which records or reproduces data by means of edge position modulation to shift the edge position at the front or rear end of an information pit from a predetermined reference position stepwise in accordance with data to be recorded (pending U.S. application Ser. No. 08/086,138 (file date Jul. 1, 1993)).

This recording/reproducing method makes it possible to detect a pit length and a change of the position of a pit edge with high accuracy, record or reproduce information with very small changes which has probably been impossible so far, and realize higher-density recording than ever.

The principle of recording data on a magneto-optical disc by means of edge position modulation is shown in FIGS. 1A to 1C.

A recording signal (FIG. 1B) modulated by PWM (Pulse Width Modulation) is first generated corresponding to data to be recorded. Then, an information pit (FIG. 1A) corresponding to the length at the time of zero crossings is formed. Thus, the edge position of the information pit changes stepwise from the position shown by the reference clock (FIG. 1C). Therefore, it is possible to record data of eight stages from 0 to 7 (that is, three bits) for one edge of the information pit.

As shown in FIGS. 2A to 2D, to reproduce the data thus recorded, an RF signal (FIG. 2A) reproduced from a magneto-optical disc is first amplified to obtain a binary RF signal (FIG. 2B). Because a clock pit is formed in the magneto-optical disc in which data is recorded, the reference clock (FIG. 2C) according to the clock pit is generated and, moreover, a serrated-waveform signal (FIG. 2D) is generated synchronously with the reference clock is generated. Then, the edge position of an information pit is detected by detecting the value of the serrated-waveform signal at the timing when the serrated-waveform signal and the binary RF signal are crossed and thus, the recorded data is reproduced.

The magneto-optical disc apparatus described above optical modulation records data while applying an alternating magnetic field to a magneto-optical disc. That is, the magneto-optical disc apparatus first generates a recording basic clock synchronous with the reference clock obtained by reproducing the clock pit of the magneto-optical disc and generates an alternating magnetic field with the same frequency as the recording basic clock to apply it to the recording position of the magneto-optical disc.

Moreover, the magneto-optical disc apparatus changes the phase of the recording basic clock in accordance with information to be recorded and applies a laser beam to the recording position of the magneto-optical disc to record the information in a magneto-optical manner.

However, because the magneto-optical apparatus generates an alternating magnetic field sufficient for recording by modulating a coil for external magnetic field generation, the frequency for applying a necessary magnetic field is limited by the characteristic of the coil. When considering recording/reproducing at a higher transfer rate by the recording/reproducing method using information-pit edge position modulation, there is a problem that the limitation for generating an alternating magnetic field with the coil for external magnetic field generation serves as a factor for determining a transfer rate.

SUMMARY OF THE INVENTION

In view of the foregoing, an object of the present invention is to provide a method for recording digital data and apparatus thereof, and a digital data recording/reproducing apparatus which can record data at higher speed with a simple constitution when recording the data by means of information-pit edge position modulation.

The foregoing object and other objects of the invention have been achieved by the provision of a method for recording digital data. The method includes the step of generating a recording basic clock which synchronizes with a reference clock previously recorded on an optical recording medium and further has a recording basic clock with the same frequency as the basic clock of a user data. The method further includes the step of generating a recording signal in which the edge phase of the recording basic clock is slightly shifted in accordance with the user data to be recorded. The method further includes the step of irradiating a laser beam modulated by the recording signal on a magneto-optical recording medium so as to form a recording pit.

Furthermore, the present invention provides the method for recording digital data, comprising the steps of: generating a recording basic clock which synchronizes with a reference clock previously recorded on an optical recording medium and further has a recording basic clock with the same frequency as the basic clock of a user data; generating a recording signal in which the edge phase of the recording basic clock is slightly shifted in accordance with the user data to be recorded; and irradiating a laser beam modulated by the recording signal on a phase-change optical disc recording medium on which a predetermined external magnetic field is impressed so as to form a recording pit.

The external magnetic field to be impressed to the magneto-optical recording medium is set as a predetermined external magnetic field, thereby data transfer speed can be improved regardless of the frequency limitation of the alternating magnetic field which can be generated by the coil for external magnetic field generation.

Furthermore, in the case of the phase-change recording medium, the external magnetic field is not generated so much compared with the case of recording data on the magneto-optical recording medium, so that the construction can be simplified.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 2A to 2D are timing charts explaining a method for reproducing a magneto-optical disc on which the data is recorded by the method for recording with high density of FIGS. 1A to 1C;

DETAILED DESCRIPTION OF THE EMBODIMENT

Figures 1A, 1B, 1C:
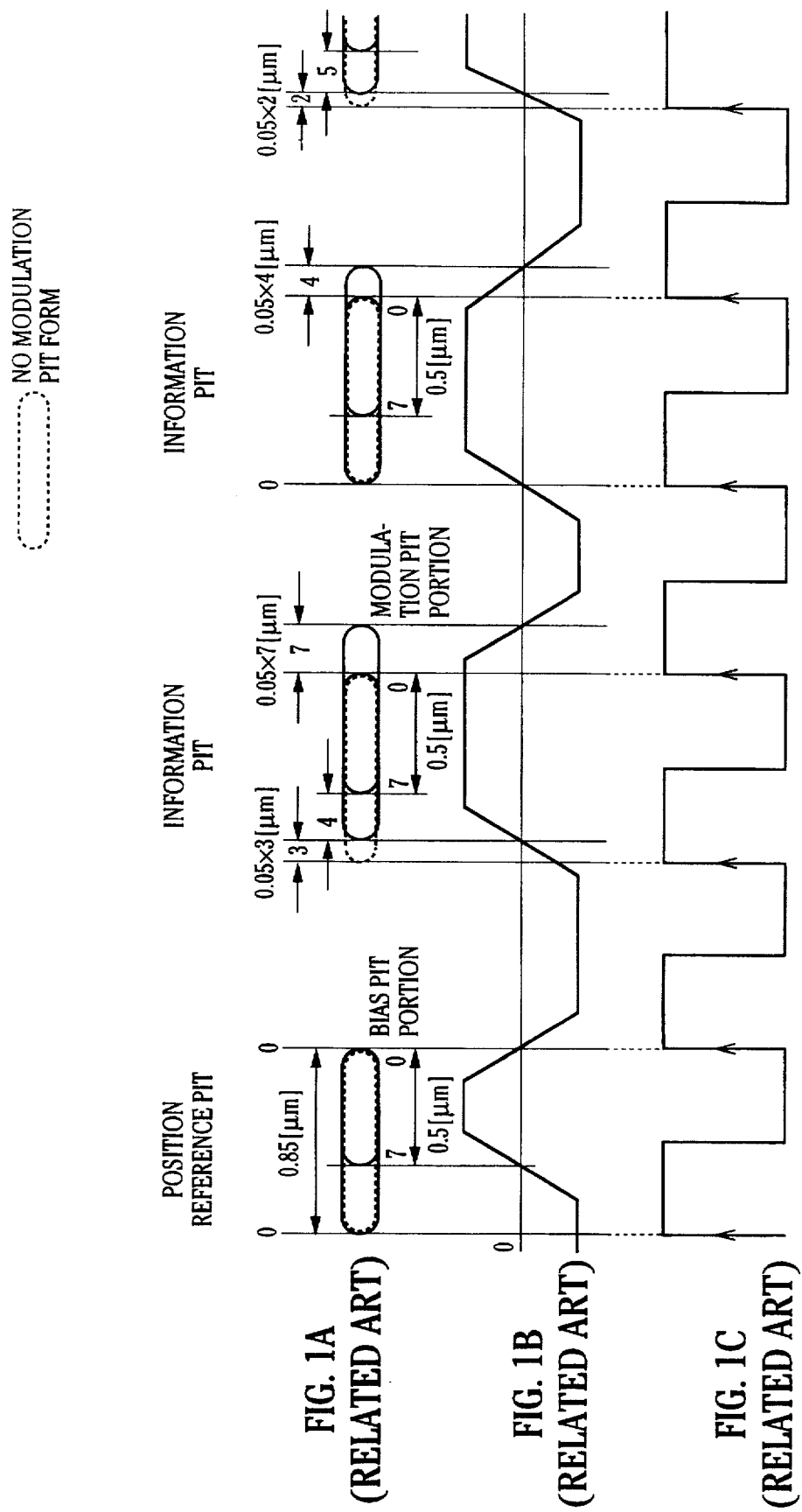
FIGS. 1A to 1C are timing charts explaining a method for recording with high density through edge position modulation used in a conventional magneto-optical disc.
Figure 3:
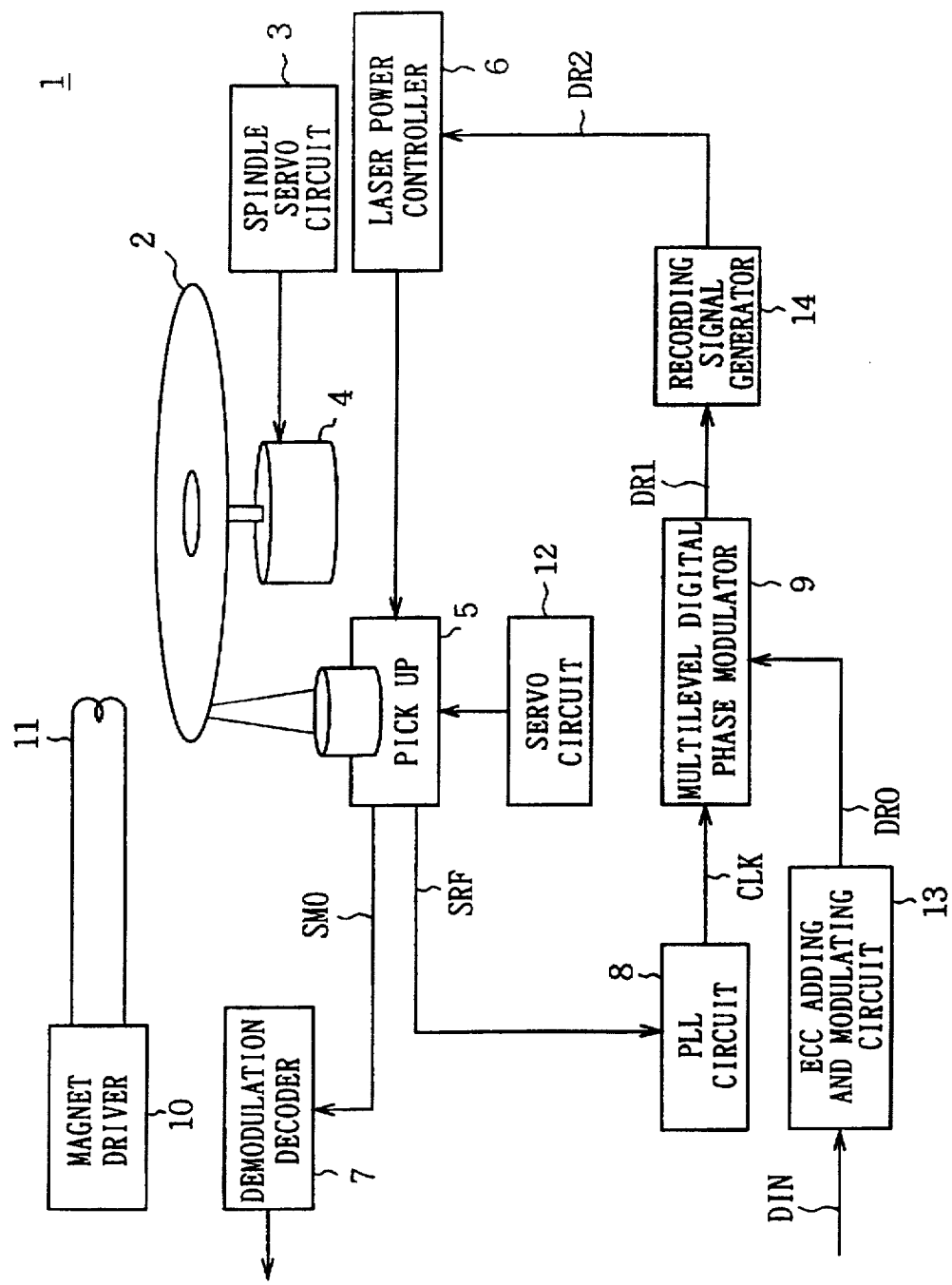
FIG. 3 is a block diagram showing a magneto-optical disc apparatus according to the method for recording digital data and apparatus thereof of the present invention.

Preferred embodiments of the present invention will be described with reference to the accompanying drawings:
(1) First Embodiment In FIG. 3, reference numeral 1 represents a magneto-optical disc apparatus to which the optical recording method of the present invention is applied as a whole. A magneto-optical disc 2 is rotary driven by a spindle motor 4 controlled by a spindle servo circuit 3 so as to meet a predetermined rotation speed or linear velocity. A pickup 5 emits a laser beam to the magneto-optical disc 2 and applies an optical spot with a predetermined intensity necessary to magneto-optical recording or reproducing in accordance with the control by a laser power control circuit 6. The pickup 5 detects the reflected light from the magneto-optical disc 2 and outputs detected signals SMO and SRF to a demodulating and decoding circuit 7 and a PLL (Phase Locked Loop) circuit 8.

The demodulating and decoding circuit 7 demodulates and decodes a signal (MO signal) SMO supplied from the pickup 5 at the time of reproduction, and outputs the signal to an output signal processing circuit (not shown). The PLL circuit 8 receives an RF signal (light intensity signal) SRF corresponding to a clock pit previously formed by means of, for example, embossing at a certain interval as a prepit on the magneto-optical disc 2, synchronizes with the clock pit, generates a clock (hereinafter referred to as the recording basic clock) CLK with the same frequency as the basic clock of a signal to be recorded in the magneto-optical disc 2, and supplied the clock CLK to a multilevel digital phase modulation circuit 9.

A coil for external magnetic field generation 11 applies an external magnetic field Hw, corresponding to the control of a magnet driving circuit 10, to the magneto-optical disc 2 at the time of recording. The coil 11 is set on the extended line of a laser beam emitted from the pickup 5. Focus servo, tracking servo, and thread servo are applied to the pickup 5 under the control of a servo circuit 12.

An ECC adding and modulating circuit 13 adds an error correction code to data DIN supplied from an input signal processing circuit (not shown), modulates the data, and outputs it to the multilevel digital phase modulation circuit 9 as recording data DRO. The multilevel digital phase modulation circuit 9 modulates the leading edge and the trailing edge of the recording basic clock CLK into multi-level digital phases by slightly shifting the edges stepwise in accordance with the recording data DRO, and generates a phase modulation signal DR1. For instance, when data of eight grades from 0 to 7 for one edge of the information pit (e.g., three-bit data for one edge) is recorded, the recording data DRO is partitioned for three bits, and the leading edge and the trailing edge of the basic clock CLK are phase modulated corresponding to the three bits.

For example, in the case where the data string such as "000010110101 . . ." is recorded, it can be partitioned such as (1) 000, (2) 010, (3) 110, (4) 101 . . . if partitioning for three bits. Therefore, the leading edge of the first basic clock CLK is not phase modulated, and the trailing edge is phase modulated so as to shift by two amounts of reference shift. This is because it is 000=0 and 010=2.

Figures 14A, 14B, 14C:
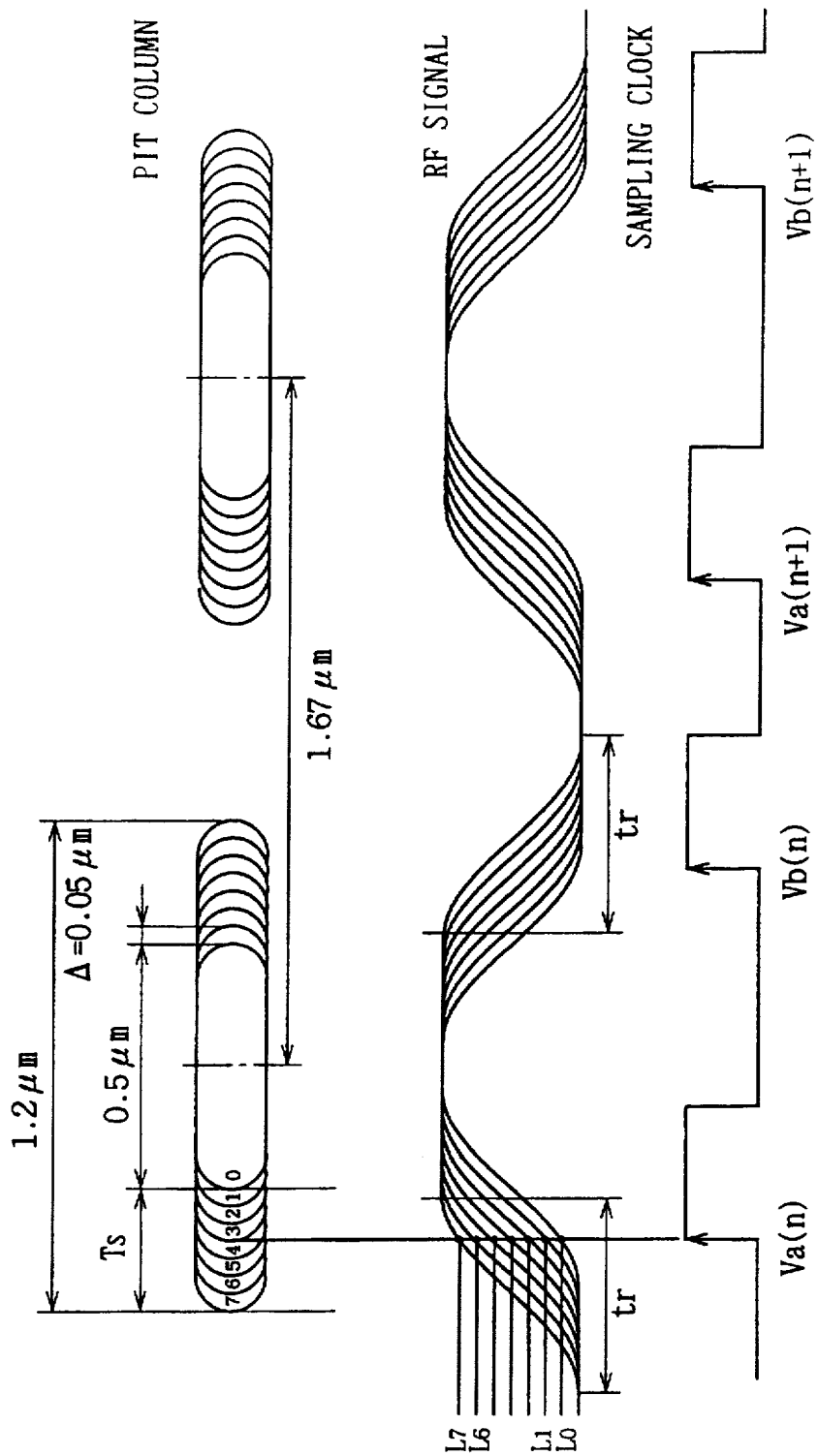
FIGS. 14A to 14C are diagrams showing edge positions of the recording pit recorded on the magneto-optical disc.

Further, the leading edge of next basic clock CLK is phase modulated so as to shift by six amounts of reference shift, and the trailing edge is phase modulated so as to shift by five amounts of reference shift. This is because it is 110=6 and 101=5. As shown in FIG. 14A, an "amount" of reference shift Δis 0.05 μm.

A laser light-emitting recording signal DR2 is generated from the phase modulation signal DR1 which is supplied to the laser power control circuit 6.

When recording data by the above constitution, as an erasing operation, the magneto-optical disc apparatus 1 irradiates a laser beam to a predetermined position from the pickup 5 controlled by the servo circuit 12 while impressing the external magnetic field Hw in a certain direction from the coil for external magnetic field generation 11 in order to control the magnetization direction of a vertical magnetization film on the magneto-optical disc 2.

Then, the magneto-optical disc apparatus 1 reverses the external magnetic field Hw with the coil for external magnetic field generation 11 for recording, and irradiates the laser beam to a recording area with a laser power control circuit 6 in accordance with the laser light-emitting recording signal DR2 output from a laser light-emitting recording signal generation circuit 14 to write information on the magneto-optical disc 2.

According to the above recording theory, FIGS. 4A to 4F show an example of modulating the recording basic clock CLK into four levels with the multilevel digital phase modulation circuit 9.

First, the edges of the basic recording clock CLK (FIG. 4A) are slightly changed in accordance with data to be recorded, modulated by the multilevel digital phase modulation circuit 9, and supplied to the laser light-emitting recording signal generation circuit 14 as a phase modulation signal (FIG. 4B). in the laser light-emitting recording signal generation circuit 14, laser light-emitting recording signal (FIG. 4C) is generated, which is supplied to the laser power control circuit 6.

The magneto-optical disc 2 previously magnetized in the direction "×" opposite to the recording direction (direction "⊙") is irradiated by a laser beam modulated under the control of the laser power control 6 in accordance with the laser light-emitting recording signal while being impressed with external magnetic field Hw in the direction of the magnetic field for recording (FIG. 4D), so that data is recorded.

Figure 4A:
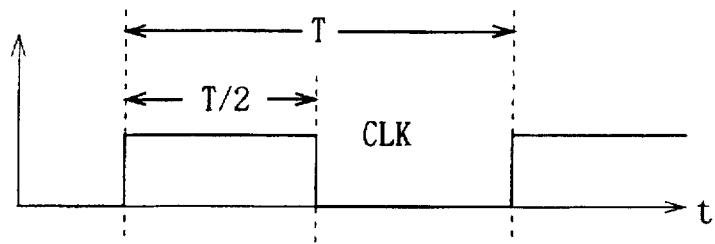
FIGS. 4A to 4F are timing charts explaining the recording operation of the magneto-optical disc apparatus of FIG. 3.
Figure 4B:
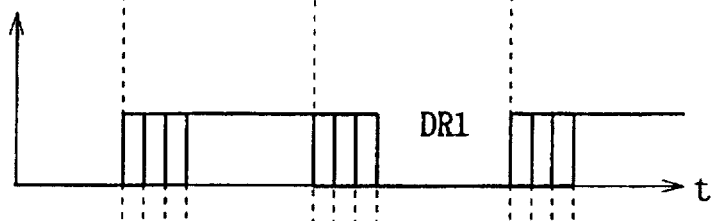
Figure 4C:
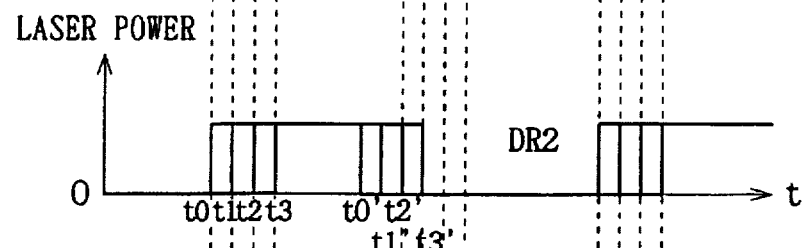
Figure 4D:
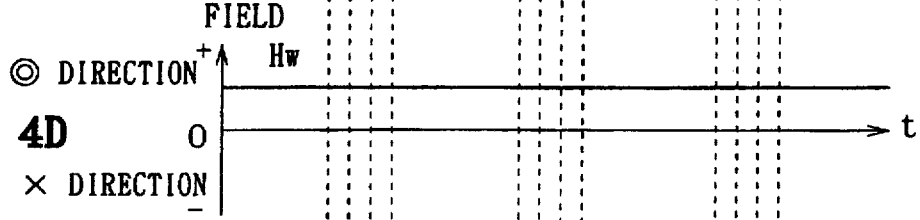

In FIG. 4D, it is assumed that the magneto-optical disc 2 is, magnetized in the direction "⊙" for the symbol "+" and in the direction "×" for the symbol "−".

Moreover, it is assumed that the external magnetic field Hw has an intensity enough to magnetize a vertical magnetization film of the magneto-optical disc 2 and the recording laser power is powerful enough so that temperature of the magnetization film sufficiently exceeds the Curie temperature in FIG. 4C.

By superimposing and writing information pits formed at pulse lightening positions t=t0, t1, t2, t3, and t0', t1', t2', t3', of all laser beams which can actually be emitted, data can be recorded through modulation of a boundary where a magnetization direction is reversed, that is, modulation of an information pit edge position.

Figure 4E:

FIGS. 4C and 4E shows that the position of the rear edge (FIG. 4E) of the pit to be formed is shifted from the position of the front edge of the position (t31 in FIG. 4C) where the laser irradiation is finished.

This is because the effect of diffusion of the laser heat is considered. More specifically, the irradiation of laser corresponding to the rear edge of the pit makes a mark larger than the size of pit desired to be recorded due to the time of heat diffusion.

Here, it is considered how much the laser should be irradiated to the pit desired to be recorded.

An experiment is made on how much the duty ratio is proper in writing the mark when a mark is written on the magneto-optical disc, under the conditions to be described later. The results of the experiments are shown in FIGS. 6A to 6C, 7A, 7B, 8A to 8C, 9A, 9B, 10A to 10C, 11A, 11B, 12A, 12B, 13A, and 13B.

Figures 5A, 5B:
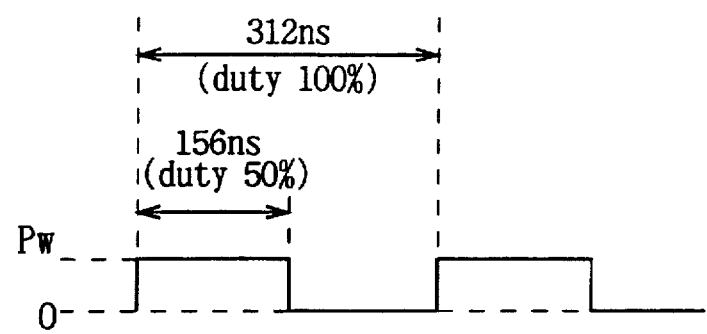
FIGS. 5A and 5B are diagrams showing relation between the mark to be recorded and the duty ratio.

Incidentally, FIGS. 5A and 5B show a relation between a mark to be recorded and the duty ratio.

In this experiment, relations between the laser irradiation time and the recording pit are determined by writing a mark for a definite cycle in which a time of 312 ns is set to be one cycle and by setting a disc line velocity to about 5.5 m for simplicity. Then experiments are made for two cases: one case in which the writing laser power Pw is 12 mW and the other case in which Pw is 16 mW.

Incidentally, as shown in FIG. 5A, the duty ratio refers to the ratio of laser emission assuming that the time 312 ns for one cycle is 100%. Consequently, the pit to be recorded has a duty ratio of 50%, which corresponds to about 156 ns. The duty ratio of 10% corresponds to about 31 ns.

FIGS. 6A to 6C, 7A, and 7B show the state of the reproduced RF signal when data is recorded by changing the duty ratio from 10 to 50% at the writing laser power Pw=12 mW. The recording direction is a direction in which the amplitude in the drawing rises.

Figure 6A:
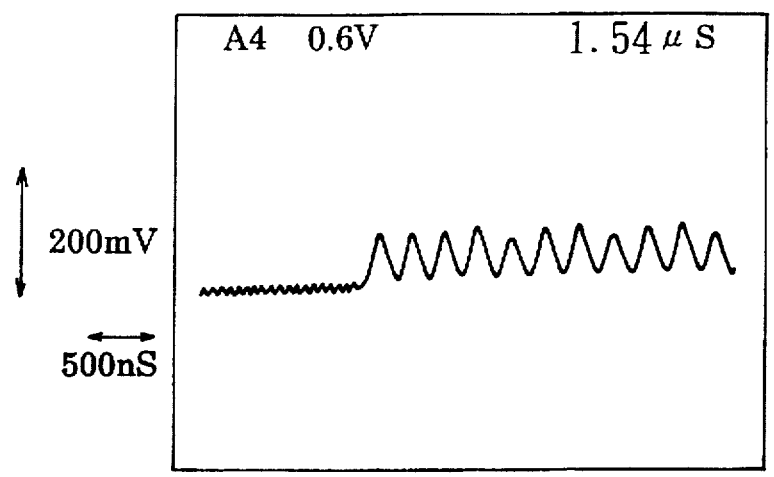
FIGS. 6A to 6C are diagrams showing the reproducing signal obtained when the duty ratio is changed from 10% to 30% at the laser power Pw=12 mW.

In the state of FIG. 6A (e.g., when the duty ratio is 10 the amplitude of the waveform is not completely raised. At the time shown in FIGS. 6B and 6C (e.g., when the duty ratio is 20M and 30%), an appropriate amplitude appears.

Figure 6B:
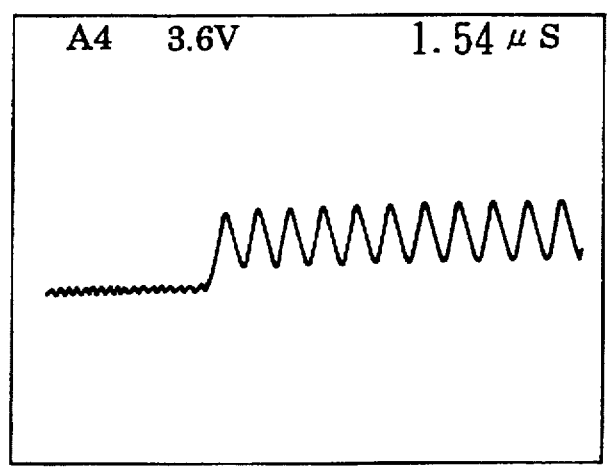
Figure 6C:
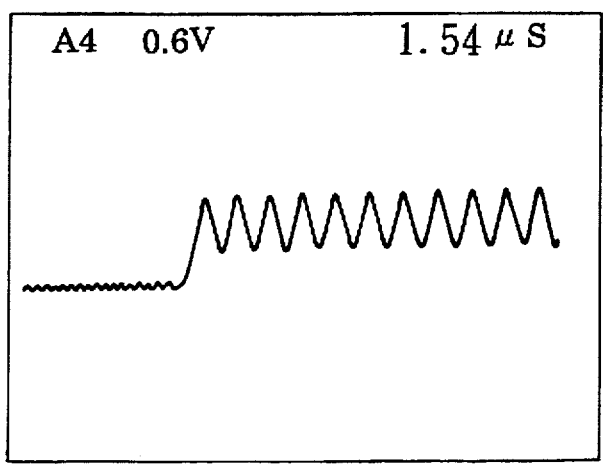
Figure 7A:
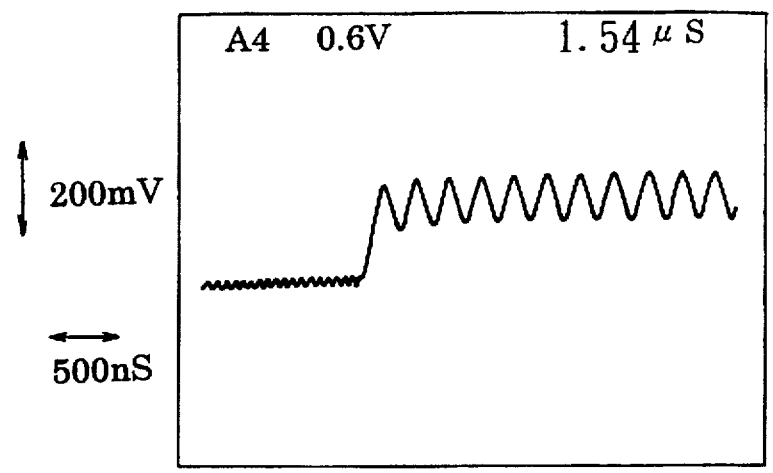
FIGS. 7A and 7B are diagrams showing the reproducing signal obtained when the duty ratio is changed from 40% to 50% at the laser power Pw=12 mW.
Figure 7B:
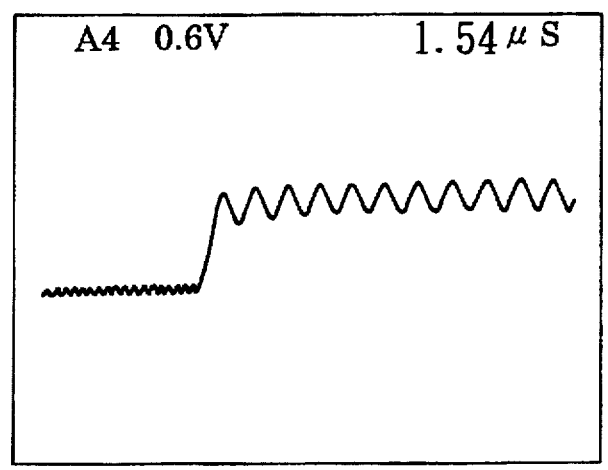
Figure 8A:
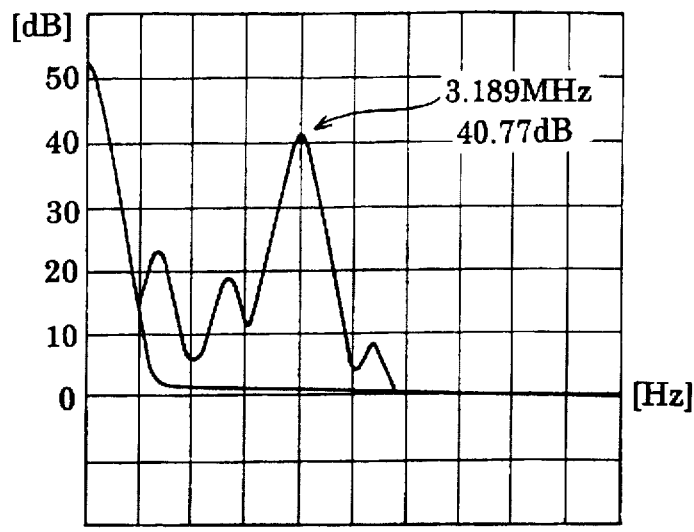
FIGS. 8A to 8C are diagrams showing waveform spectrums of FIGS. 6A to 6C.
Figure 8B:
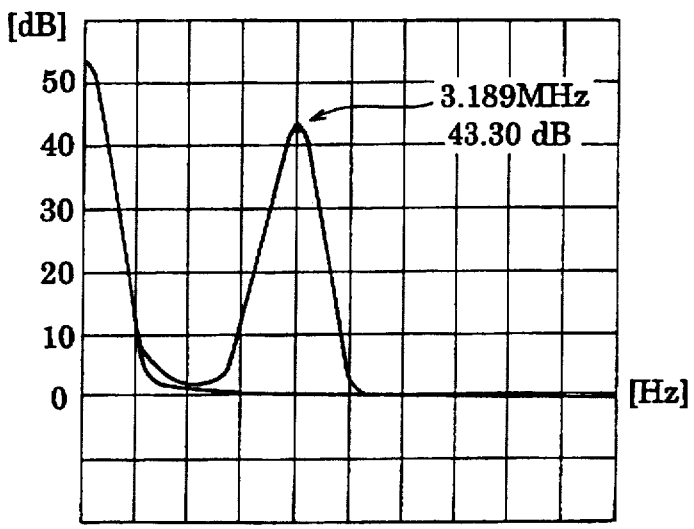
Figure 8C:
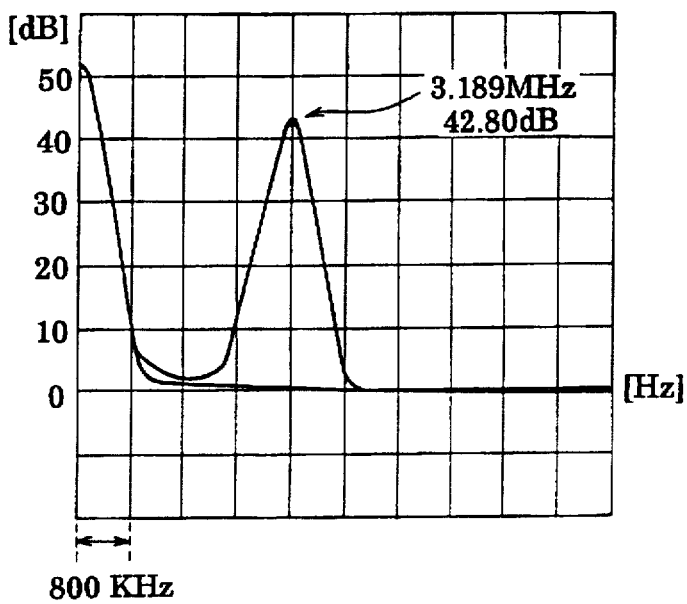
Figure 9A:
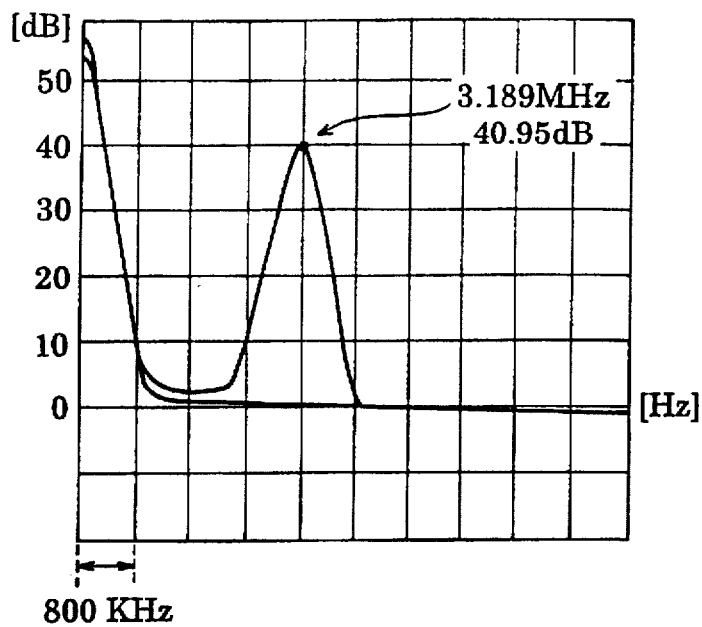
FIGS. 9A and 9B are diagrams showing waveform spectrums of FIGS. 7A and 7B.
Figure 9B:
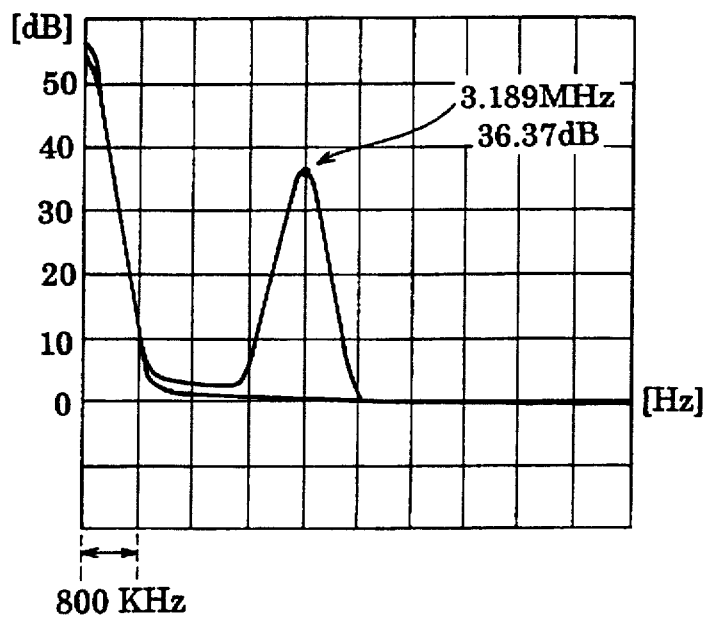
Figure 10A:
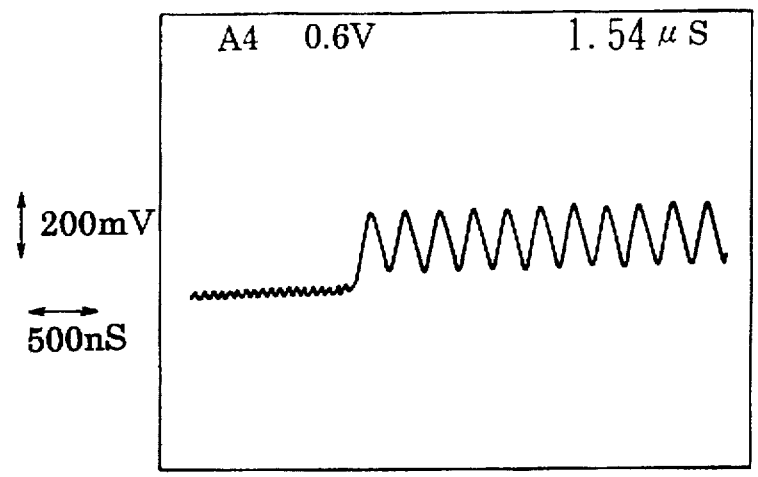
FIGS. 10A to 10C are diagrams showing the reproducing signal obtained when the duty ratio is changed from 10% to 30% at the laser power Pw=16 mW.
Figure 10B:
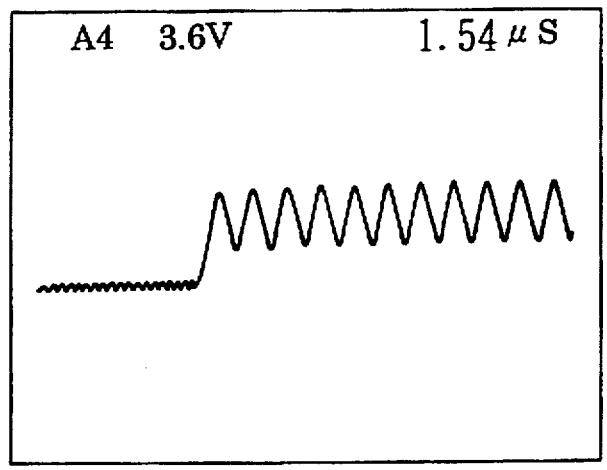
Figure 10C:
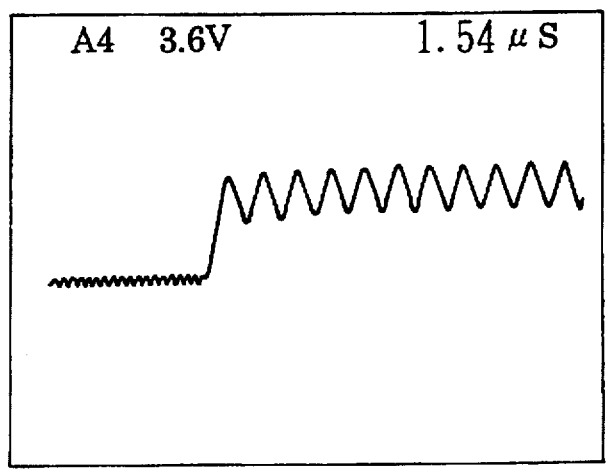

However, at the time shown in FIGS. 7A and 7B (e.g., when the duty ratio is 40% and 50%), the recorded mark is so long that the amplitude becomes smaller as compared with the amplitude shown in FIGS. 6B and 6C.

FIGS. 8A to 8C, 9A, and 9B show spectra of waveforms shown in FIGS. 6A to 6C, 7A, and 7B. As seen from FIGS. 8A to 8C, 9A, and 9B, the carrier level (C/N ratio) becomes the highest when the duty ratio is 20% and 30%. Consequently, because a C/N ratio of 41 dB or more is desired, in this case, it can be said that the mark is most clearly written on the disc when the duty ratio is 20% to 30%.

Figure 11A:
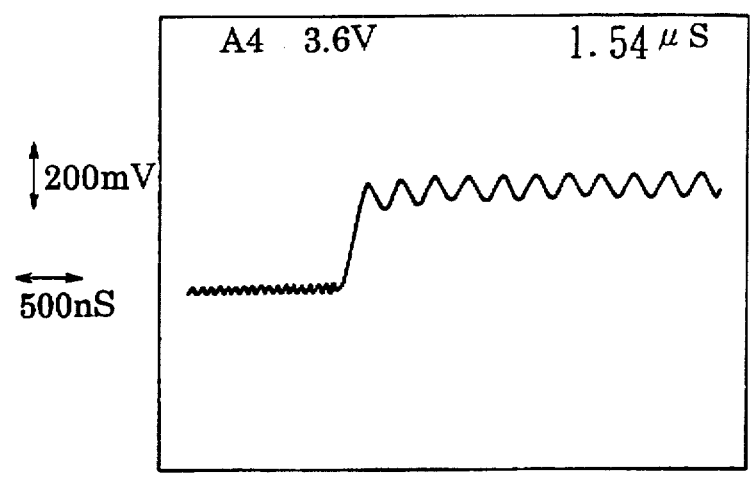
FIGS. 11A and 11B are diagrams showing the reproducing signal obtained when the duty ratio is changed from 40% and 100% at the laser power Pw=16 mW.
Figure 11B:
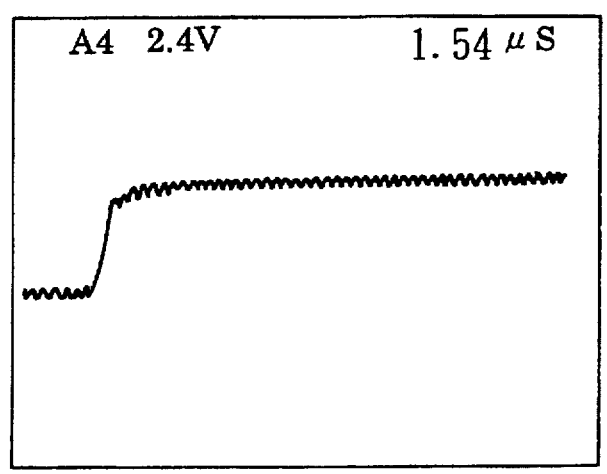
Figure 12A:
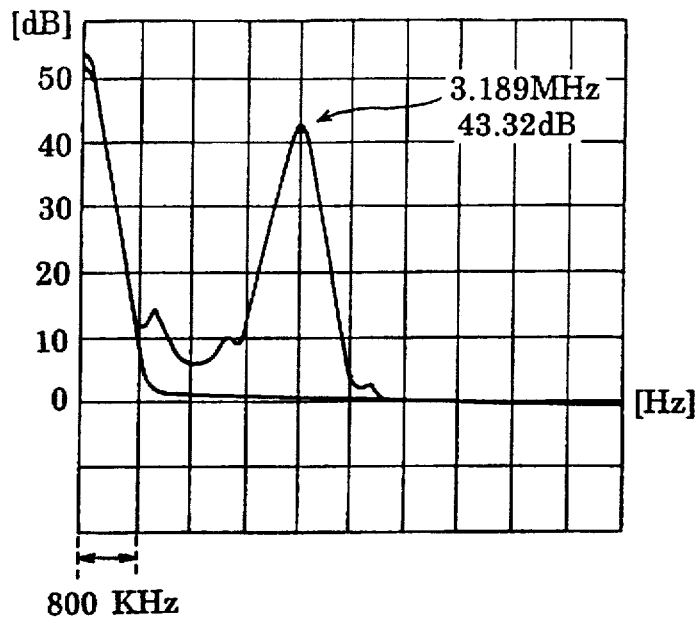
FIGS. 12A and 12B are diagrams showing waveform spectrums when the duty ratio is changed from 10% to 20% at the laser power Pw=16 mW.
Figure 12B:
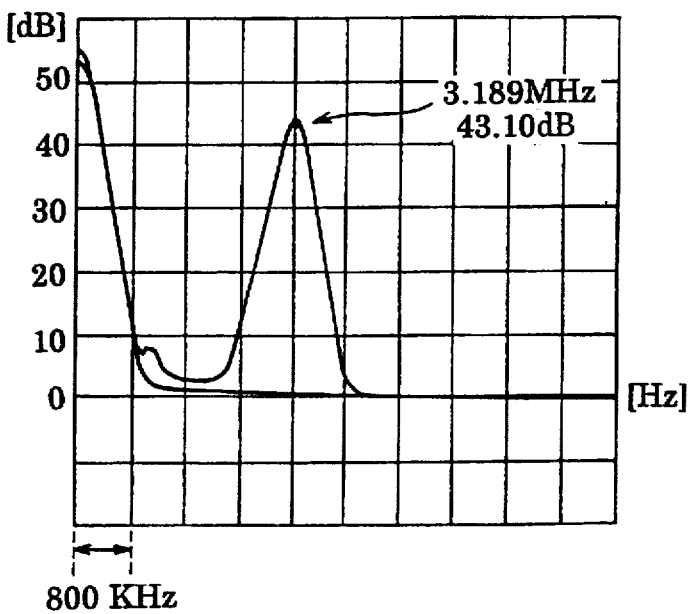
Figure 13A:
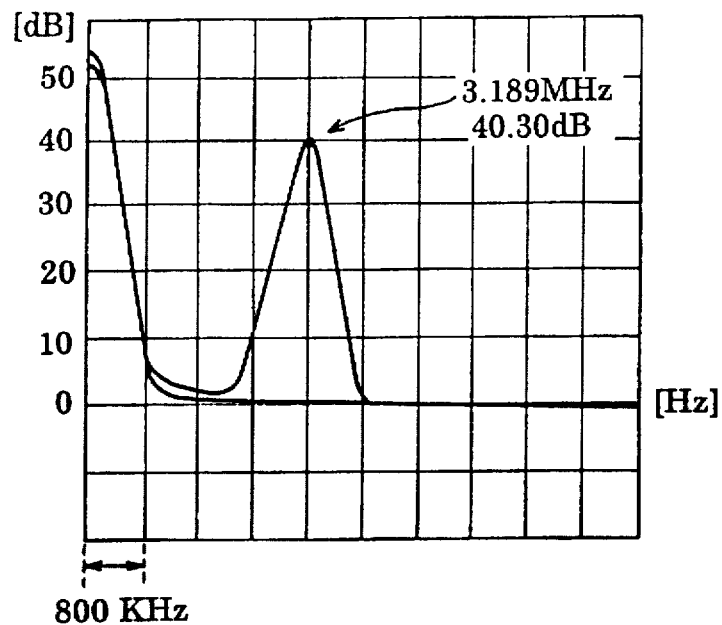
FIGS. 13A and 13B are diagrams showing waveform spectrum when the duty ratio is changed from 30% to 40% at the laser power Pw=16 mW.
Figure 13B:
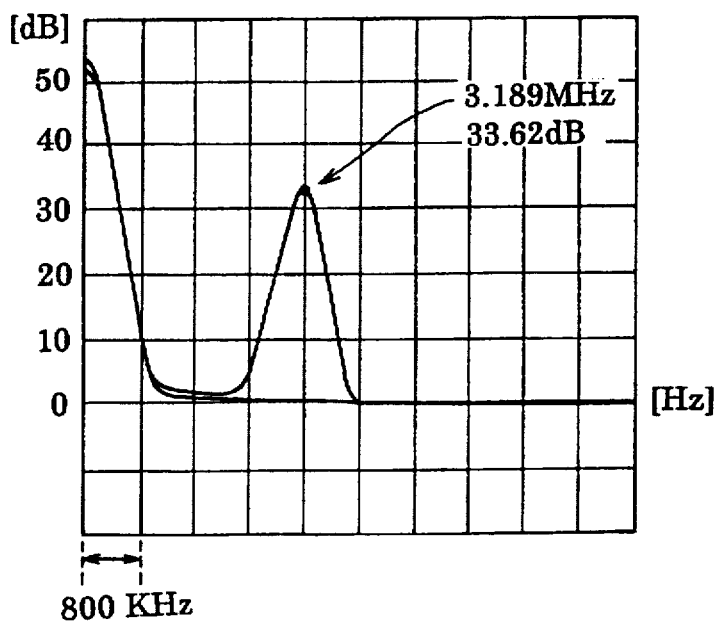

FIGS. 10A to 10C, 11A, and 11B show the state of the reproduced RF signal when data is recorded by changing the duty ratio from 10 to 40% when the laser power Pw=16 mW. For reference, experiment data when the duty ratio is 100% is also shown in FIG. 11B.

In the examples shown in FIGS. 10A to 10C, 11A, and 11B, the recording power becomes higher, so the duty ratio at which the mark can be written most appropriately becomes 10 to 20%.

FIGS. 12A, 12B, 13A, and 13B show spectra waveforms shown in FIGS. 10A to 10C, 11A, and 11B. In a consideration similar to that shown in FIGS. 8A to 8C, 9A, and 9B, it can be said that the mark is most clearly written on the disc when the duty ratio is 10 to 20M.

Figure 4F:
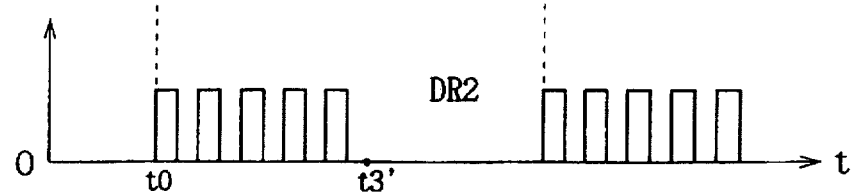

Incidentally, in this magneto-optical recording, an information pit is formed with heat generated by laser beam. Thus the recording laser pulse needs not to be emitted continuously. The laser irradiation pulse may be given so that the information pit becomes a shape as shown in FIG. 4E. Consequently, with respect to the light emission pulse shown in FIG. 4C, when it is desired to form pits from t0 to t3', a plurality of fine pulses may be continuously emitted as shown in FIG. 4F.

According to the constitution described above, the recording reference clock CLK is generated which synchronizes with the reference clock pit previously recorded on the magneto-optical disc 2 and has the same frequency as the reference clock of the data DRO to be recorded, the phase modulation signal DR1 is generated in which the phase of the recording reference clock CLK is slightly shifted in accordance with the data DRO to be recorded, and a laser beam is modulated with the phase modulation signal DR1 so that the data DRO is recorded in the magneto-optical disc 2, therefore the data can be recorded at a high speed with a simple constitution through the edge position modulation of information pit.

Moreover, according to the constitution described above, writing through optical modulation makes the data possible to be written in an information pit by modulating at a high speed, and further makes a magneto-optical disc capable of recording on both sides possible to be used.

Moreover, according to the embodiment described above, the external magnetic field Hw generated by the coil for external magnetic field generation 11 controlled by the magnet driving circuit 10 is impressed to the magneto-optical disc 2. However, the-present invention is not only limited to this, but a magnet can be used for impression instead of the coil for external magnetic field generation 11. In this case, the magnetic field to be impressed to the magneto-optical disc 2 is reversed when erasing and recording, so that it can be realized the same effect as the embodiment described above.

(2) Second Embodiment

Figure 15:
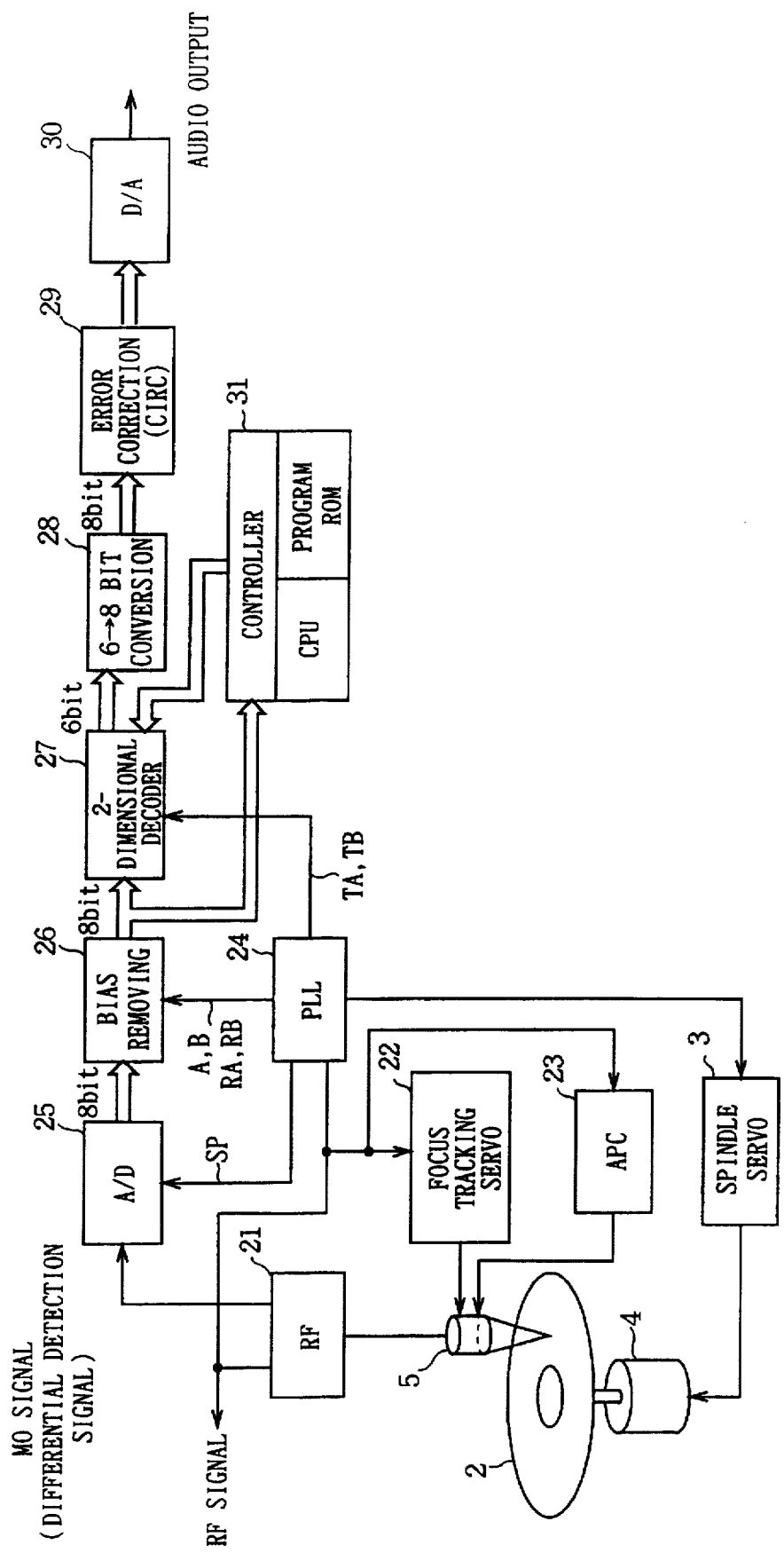
FIG. 15 is a block diagram showing-construction of the magneto-optical recording/reproducing apparatus of the present invention.

Next, FIG. 15 is a block diagram showing a structure of a magneto-optical recording/reproducing apparatus of the present invention. The magneto-optical disc 2 is constituted so as to be rotated by the spindle motor 4. Information is recorded with a recording format shown in FIG. 14A–14C on this magneto-optical disc 2. In other words, digital information is recorded by shifting at least one position out of the front end or the rear end edge of the information pit in a stepwise manner from the predetermined reference position. In the magneto-optical disc 2, a servo area is formed in a definite cycle on which the clock pit and the tracking pits are formed like a conventional sampled servo format. The data pits are formed in the data area.

The pickup 5 irradiates laser beam to the magneto-optical disc 2 to reproduce a signal recorded on the magneto-optical disc 2 from the reflection light. The detecting signal of the pickup 5 is processed at the RF circuit 21, and separated into the RF signal corresponding to the change of the reflection light quantity of laser beam irradiated to the magneto-optical disc 2 and the MO signal corresponding to the direction of Kerr rotation angle of the reflection light of laser beam irradiated to the magneto-optical disc 2 in order to be output.

The pickup 5 comprises a laser beam source such as laser diode, optical products such as a collimator lens, an objective lens, a deflected beam splitter, a cylindrical lens, and a photodetector divided into a predetermined patterns. The pickup 5 irradiates laser beam to an object track on the magneto-optical disc 2, and outputs a detection signal corresponding to P polarized light component and S polarized light component from the reflection light.

Then, the RF circuit 21 differentially amplifies detection signal of the P polarized light component and the detection signal of the S polarized light component, so that the rotation of the polarized light surface in which laser beam receives in the magneto-optical film (vertical magnetization film) of the magneto optical disc 2, that is, a Kerr rotation angle, is detected. Then, the signal corresponding to the detected kerr rotation angle is output as the MO signal.

At the same time, the sum of the detection signals of the P polarized light component and the S polarized light component is amplified, so that the intensity of the reflection light quantity on the basis of the refraction phenomenon in which the laser-beam received on the reflection surface of the magneto-optical disc 2 is detected, and thus a signal corresponding to the reflection light quantity is output as an RF signal.

The RF signal output from the RF circuit 21 is supplied to a focus tracking servo circuit 22, an APC circuit 23 and a PLL circuit 24. The focus tracking servo circuit 22 generates a focus error signal and a tracking error signal from the input signal. In accordance with the error signal, the focus control and the tracking control are performed. Then, the APC circuit 23 applies a servo so that the power of the laser beam irradiated to the magneto-optical disc 2 becomes definite.

The PLL circuit 24 extracts a clock component from the RF signal corresponding to the clock pit CP supplied from the RF circuit 21, and generates the sample clock SP and other clocks in a predetermined phase relation to supply them to an A/D conversion circuit 25, a bias removing circuit 26 and a two-dimensional decoder 27. The PLL circuit used in normal CD systems reproduces clocks by using all the RF signals. In the case of this embodiment, clocks are reproduced by using only the RF signal corresponding to the clock pit CP which is formed as a prepit by, for example, emboss processing on the magneto-optical disc 2. Thus, a stable clock is reproduced without being affected by the influence of the data pit recorded on the magneto-optical film. Further, the spindle servo circuit 3 controls the spindle motor 4 to control the magneto-optical disc 2 so as to rotate at a definite angle velocity.

In the meantime, the MO signal output by the RF circuit 21 is input to the A/D conversion circuit 25 to be A/D converted into eight bits of digital data (reproduction level) showing 256 stages of levels at the timing of rise of the sample clock SP. The eight bits of data is supplied to the bias removing circuit 26 so as to remove the bias component, and then is supplied to the two-dimensional decoder 27 and a Controller 31.

The controller 31 comprises a CPU for performing each kind of calculations, a program ROM in which the program to be performed by the CPU is stored or the like to perform the mapping of data reproduced by the recorded data marks to the twodimensional decoder 27.

The two-dimensional decoder 27 decodes the signal supplied from the bias removing circuit 26, and supplies the output to a 6-to-8 bit conversion circuit 28.

The 6-to-8 bit conversion circuit 28 accumulates four sets of six bits of data input, and then converts the data into three sets of eight bits of data to output it to an error correction circuit 29.

The error correction circuit 29 corrects an error of input data, and then outputs the data to a D/A conversion circuit 30. The D/A conversion circuit 30 converts the input data into an analog signal, and then output it to an analog amplifier not shown.

Incidentally, detailed operations of the bias removing circuit 26, the two-dimensional decoder 27 and the like are described in pending U.S. patent application Ser. No. 08/133,124 previously filed by the applicant of the present invention. Thus, the explanation thereof is omitted here.

(3) Third Embodiment

Figure 16:
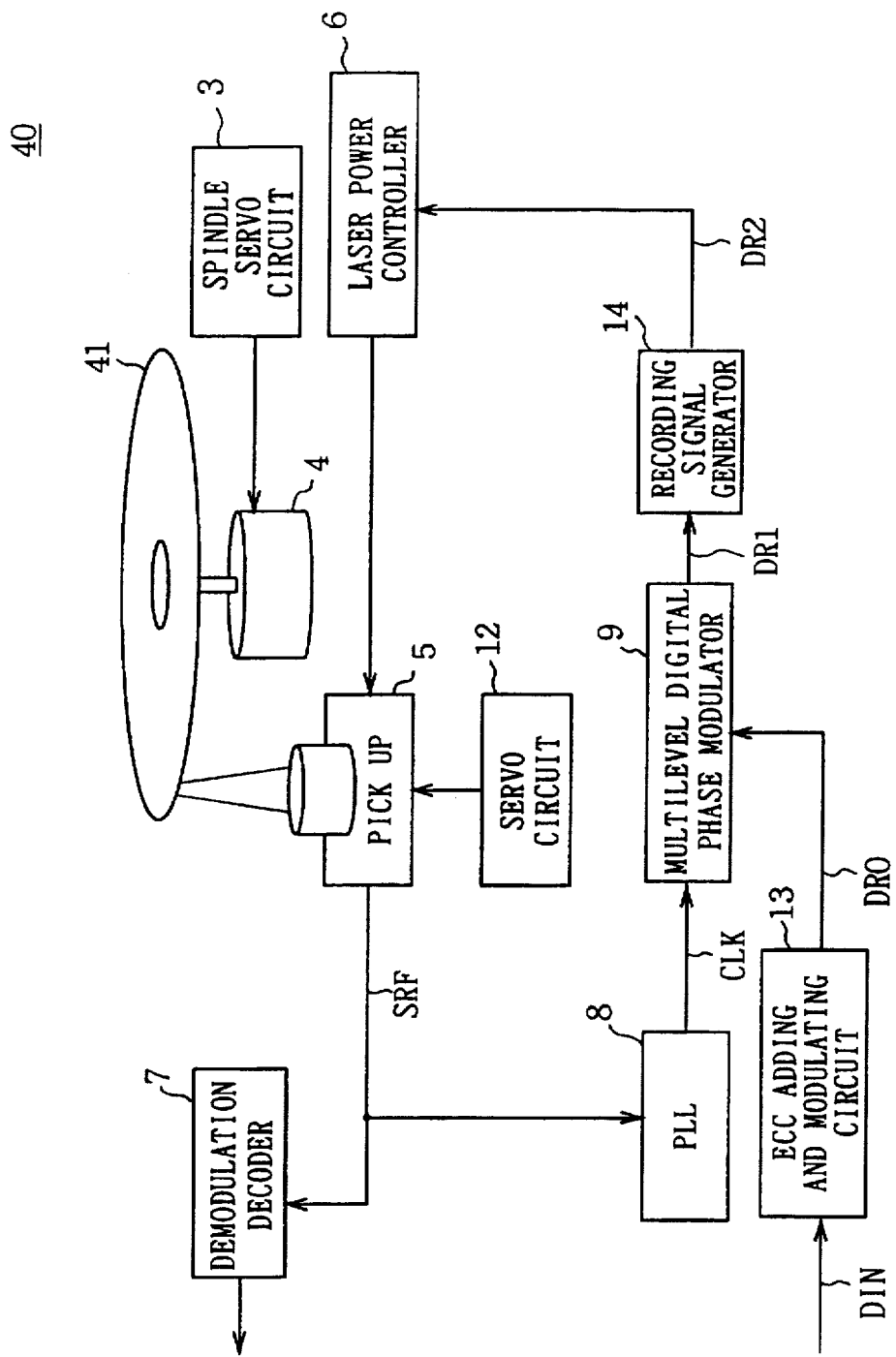
FIG. 16 is a block diagram showing a phase-change optical disc apparatus according to the method for recording digital data and apparatus thereof of the present invention.

Following description is about a case where the recording method of the present invention is applied to a phase-change optical disc apparatus. FIG. 16 shows the phase-change optical disc apparatus, in which same reference numerals are given to the corresponding part to FIG. 3.

The phase-change optical disc 41 is recorded an embossed pit string previously on its surface at a certain interval and is rotary driven by the spindle servo circuit 3 so as to meet a predetermined rotation speed or linear velocity.

The PLL circuit 8 generates a clock (hereinafter referred to as a recording basic clock) CLK which synchronizes with the embossed pit on the optical disc 41 and corresponds to the frequency of the basic clock of a signal to be recorded on the optical disc 41 in accordance with the RF signal SRF obtained from the embossed pit string, and then supplies it to the multilevel digital phase modulation circuit 9. When recording, the laser light-emitting recording signal DR2 is generated in the recording signal generation circuit 14 in accordance with the phase modulation signal DR1 output from the multilevel digital phase modulation circuit 9, and the laser beam is irradiated to a recording area with the laser power control circuit 6 in accordance with the signal DR2 so as to write information on the optical disc 41.

As the theory for recording data, FIGS. 17A to 17E show a case of modulating the recording basic clock CLK into four levels with the multilevel digital phase modulation circuit 9, similar to the aforementioned case of the magneto-optical disc.

Figure 17A:
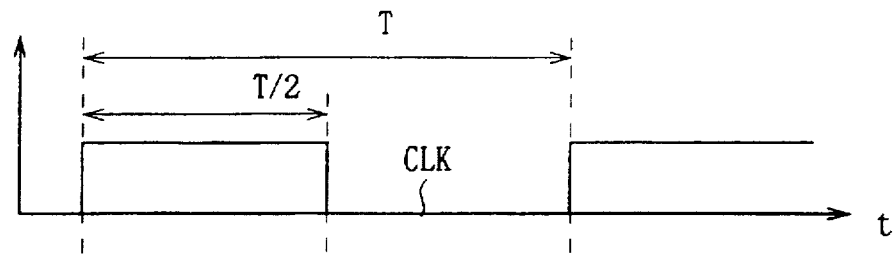
FIGS. 17A to 17E are timing charts explaining the recording operation of the phase-change optical disc apparatus in FIG. 16.
Figure 17B:
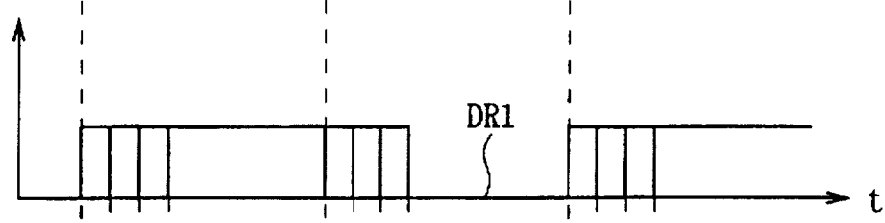

The recording basic clock CLK (FIG. 17A) is modulated by the multilevel digital phase modulation circuit 9 which slightly changes the edge of the basic clock in accordance with data to be recorded, and then is input to the recording signal generation circuit 14 as the phase modulation signal DR1 (FIG. 17B).

The recording signal generation circuit 14 generates the actual laser light-emitting signal DR2 (FIG. 17C) so as to form a desired mark on the optical disc 41 in accordance with the phase modulation signal DR1, and irradiates a laser beam to the optical disc 41 with the laser light-emitting recording signal DR2 to record data.

Figure 17C:
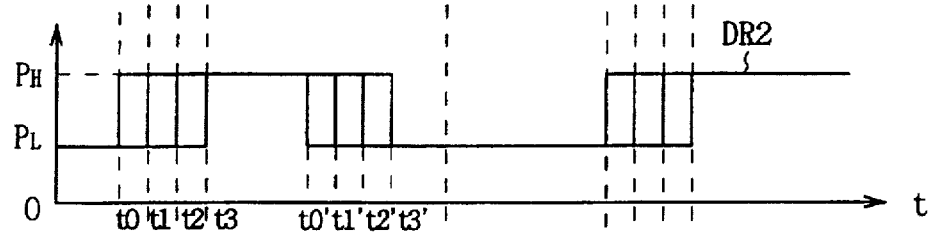

When a laser beam with a high laser power PH shown in FIG. 17C is irradiated to the optical disc 41, the temperature of the irradiated portion of the disc rises. Thereby, the portion dissolves and becomes amorphous while it is cooled.

Further, when a laser beam with a low laser power PL is irradiated to the optical disc 41, the irradiated portion of the disc becomes crystallizable and then becomes crystal while it is cooled. Data in these portions can be overwritten because the portions do not depend on the mark previously written on the optical disc 41.

Figure 17D:

When superimposing and writing the marks formed at the pulse lightening positions t=t0, t1, t2, t3, and t0', t1', t2', t3' of all laser beams which can actually be@ emitted, it is possible to record digital data modulated by slightly shifting stepwise from a reference position (the edge of the position reference pit) to the edge of a mark at a boundary (edge of a mark) where a status change of the optical disc 41 occurs as shown in FIG. 17D.

FIGS. 17C and 17D show that the end position of pit to be formed (FIG. 17D) shifts from the position where the laser irradiation is finished (t3' in FIG. 17C). This is because effect of diffusion of the laser heat is considered. More specifically, the irradiation of laser corresponding to the rear edge of the pit makes a mark larger than the size of pit to be recorded due to the time of heat diffusion. The description of how much the laser should be irradiated to the pit to be recorded is omitted here because it is similar to the aforementioned case of the magneto-optical disc.

Figure 17E:
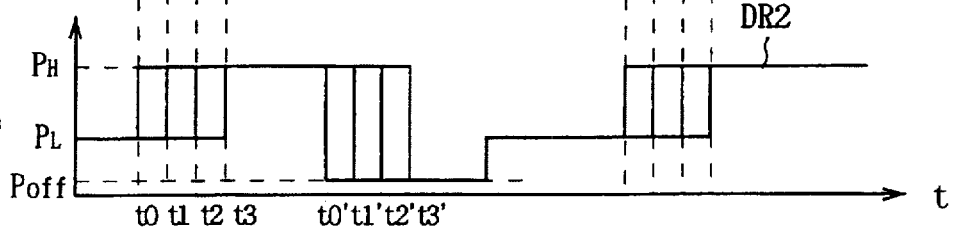

Moreover, FIG. 17E shows the other example of the laser light-emitting recording signal (FIG. 17C). In FIG. 17E, the laser is emitted with PH power, and then decreased to P off power for a predetermined time to prevent from accumulation of the heat. As a result, the desired pit can be formed. Also in the case of the phase-change optical disc, a laser can be emitted with PH power or PL power in a plurality of pulse strings, similar to FIG. 4F.

According to the constitution described above, the data in the phase-change optical disc 41 can be overwritten only through laser beam modulation without using the*external magnetic field, so that the external magnetic field is not necessary and also the optical system is simplified compared to the case of the magneto-optical disc. Therefore, it is possible to realize the optical disc apparatus whose weight, thickness, and price can be decreased.

(4) Another Embodiment

Moreover, in the embodiment described above, the clock information is previously recorded in prepits such as embossed pits on the magneto-optical disc 2 or the phase-change optical disc 41. However, it is possible to form not only clock information but also tracking information or positional information such as a sector, address, or absolute time on embossed pits. Furthermore, it is possible to previously record data not only as embossed pits but also as pregrooves on a magneto-optical disc.

Furthermore, in the case of the above first embodiment, the magnetization direction of a vertical magnetization film on the magneto-optical disc 2 is oriented in a certain direction in the erasing process before magneto-optical recording. However, when using a multilayer-film type of magneto-optical disc in which data can be overwritten as a magneto-optical recording medium instead, the erasing process is unnecessary and thereby the recording operation is further simplified and data can easily be overwritten.

Furthermore, in the case of the above embodiment, optical modulation recording of data is performed on a discoid recording medium such as a magneto-optical disc or a phase-change optical disc by shifting the edge position of a recording basic clock stepwise in accordance with recorded data. However, the shape of the recording medium is not only limited to this, but can be widely applied to optical recording methods and optical recording apparatus for various types of optical recording medium such as a card and a tape.

As described above, in the present invention, a recording basic clock is generated which synchronizes with the reference clock previously recorded on an optical recording medium and has the-same frequency as the basic clock of data to be recorded, the recording signal is generated in which the phase of recording basic clock is slightly shifted corresponding to the data to be recorded, and the data is recorded on the optical recording medium by modulating a laser beam by the recording signal. Therefore, it is possible to realize a method for recording digital data, a digital data recording apparatus and a digital data recording/reproducing apparatus capable of recording data with a simple constitution at a high speed when a data is optically recorded by shifting the edge position of information pit stepwise from the predetermined reference position in accordance with the recording information.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A method for recording digital data, comprising the steps of:

generating a recording basic clock synchronized with a reference clock pit previously recorded on a phase-change optical recording medium, and having the same frequency as a basic clock of user data that is to be recorded;

dividing the user data to be recorded into a predetermined unit, shifting the timing of an edge of the recording basic clock by an amount corresponding to the predetermined unit of user data and thus generating a modulation signal;

generating a recording signal for controlling laser beam irradiation, the recording signal being synchronized with the modulation signal; and recording the user data on the phase-change optical recording medium by irradiating laser beam modulated in accordance with the recording signal to the phase-change optical recording medium so as to form a recording pit, wherein a location of an edge of the recording pit is determined by the modulation of the laser beam.

2. The method for recording digital data according to claim 1, wherein:

the recording pit comprises a bias pit part having a definite length and a modulation pit part added to both the front end and the rear end of the bias pit part; and a distance between the centers of the bias pit part in each recording pit is equal.

3. The method for recording digital data according to claim 1, wherein
the recording signal is generated so as to have a pulse width shorter than that of the modulation-signal in terms of time.

4. A method for recording digital data, comprising the steps of:
generating a recording basic clock synchronized with a reference clock pit previously recorded on a phase-change optical recording medium, and having the same frequency as a basic clock of user data that is to be recorded;
dividing the user data to be recorded into a predetermined unit, shifting the timing of an edge of the recording basic clock by an amount corresponding to the predetermined unit of user data and thus generating a modulation signal;
generating a recording signal for controlling laser beam irradiation, the recording signal being synchronized with the modulation signal; and
recording the user data on the phase-change optical recording medium by irradiating laser beam modulated in accordance with the recording signal to the phase-change optical recording medium so as to form a recording pit, wherein a location of an edge of the recording pit is determined by the modulation of the laser beam;
wherein the pulse width of the recording signal is between approximately one fifth and three fifths of the pulse width of the modulation signal.

5. The method for recording digital data according to claim 1, wherein:
the recording medium comprises a servo area being previously recorded control data used for recording user data and a data area being recorded with the user data.

6. The method for recording digital data according to claim 5, wherein:
the servo area is an area where a plurality of education pit representing all the combinations that either the front end edge or the rear end edge in the recording pit may have is previously recorded.

7. A digital data recording apparatus, comprising:
means for generating a recording basic clock synchronized with a reference clock pit previously recorded on a phase-change optical recording medium, and having the same frequency as a basic clock of user data that is to be recorded;
means for dividing the user data to be recorded into a predetermined unit, shifting the timing of an edge of the recording basic clock by an amount corresponding to the predetermined unit of user data and thus generating a modulation signal;

means for generating a recording signal for controlling laser beam irradiation, the recording signal being synchronized with the modulation signal; and
means for recording the user data on the phase-change optical recording medium by irradiating laser beam modulated in accordance with the recording signal to the phase-change optical recording medium so as to form a recording pit, wherein a location of an edge of the recording pit is determined by the modulation of the laser beam.

8. A digital data recording/reproducing apparatus, comprising:
means for generating a recording basic clock synchronized with a reference clock pit previously recorded on a phase-change optical recording medium, and having the same frequency as a basic clock of user data that is to be recorded;
means for dividing the user data to be recorded into a predetermined unit, shifting the timing of an edge of the recording basic clock by an amount corresponding to the predetermined unit of user data and thus generating a modulation signal;
means for generating a recording signal for controlling laser beam irradiation, the recording signal being synchronized with the modulation signal;
means for recording the user data on the phase-change optical recording medium by irradiating laser beam modulated in accordance with the recording signal to the phase-change optical recording medium so as to form a recording pit, wherein a location of an edge of the recording pit is determined by modulation of the laser beam;
means for reading data from the phase-change optical recording medium in which the user data is recorded, and generating a reproducing signal;
means for detecting an amount of shift in the location of the edge of the recording pit from the reproducing signal; and
means for decoding the user data from the amount of shift.

9. A digital data recording apparatus for recording digital data on a phase-change recording medium, the apparatus comprising:
a laser for forming pits on the recording medium;
generation means for generating a recording signal so that the location of edges in the recording signal relative to the location of edges in a recording basic clock represent user data to be recorded on the recording medium; and
means for controlling the laser to form pits on the recording medium modulated according to the recording signal, so that locations of edges of the pits correspond to the user data.

* * * * *